March 9, 1954 G. P. KRAUSE ET AL 2,671,339
TUBE TESTING MACHINE
Filed April 26, 1950 3 Sheets-Sheet 1
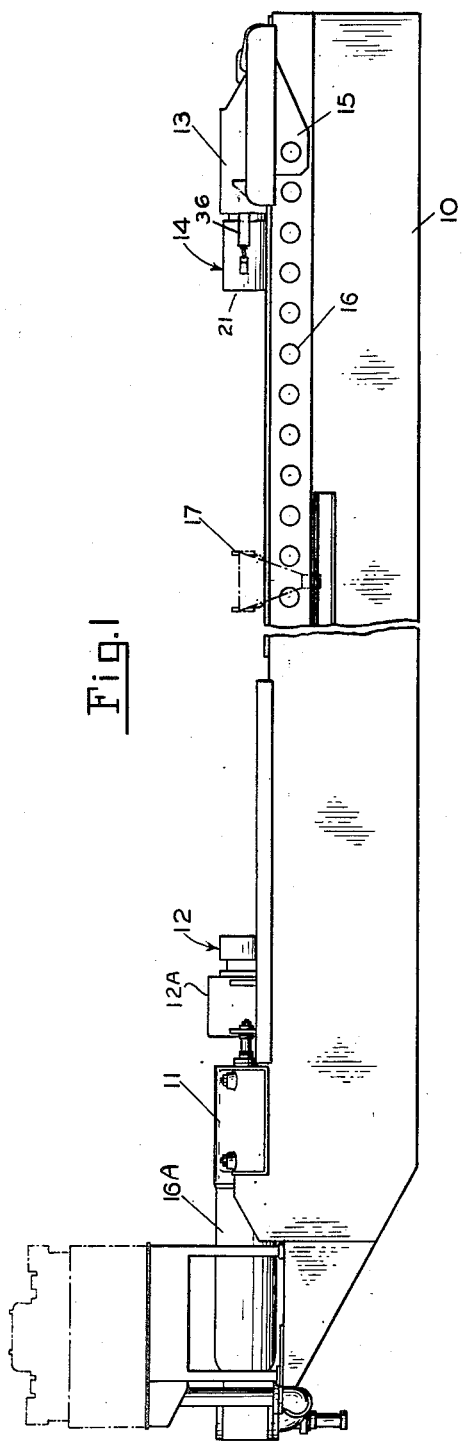
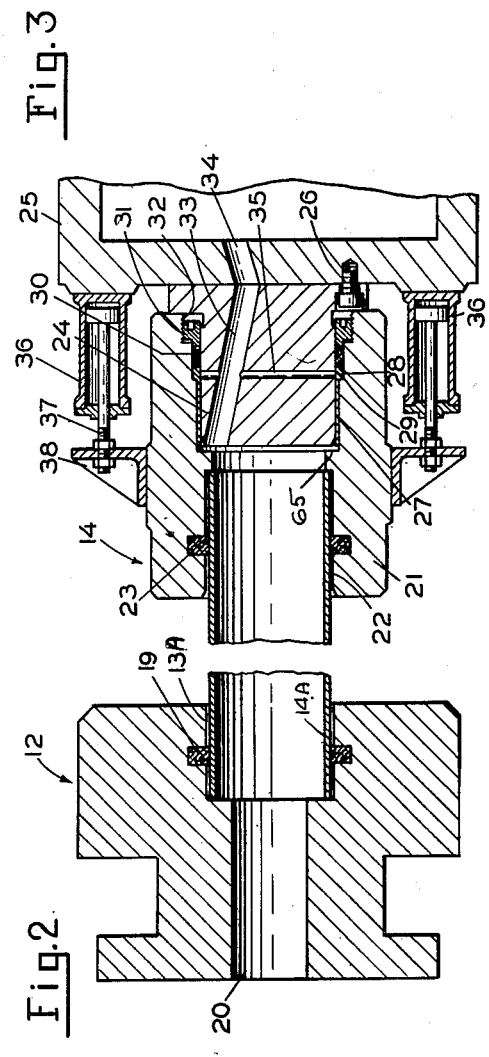
INVENTORS
GERHARD P. KRAUSE
LEO HOFFMANN
BY
Pollard & Johnston
ATTORNEYS March 9, 1954
G. P. KRAUSE ET AL
2,671,339
TUBE TESTING MACHINE
Filed April 26, 1950
3 Sheets-Sheet 2
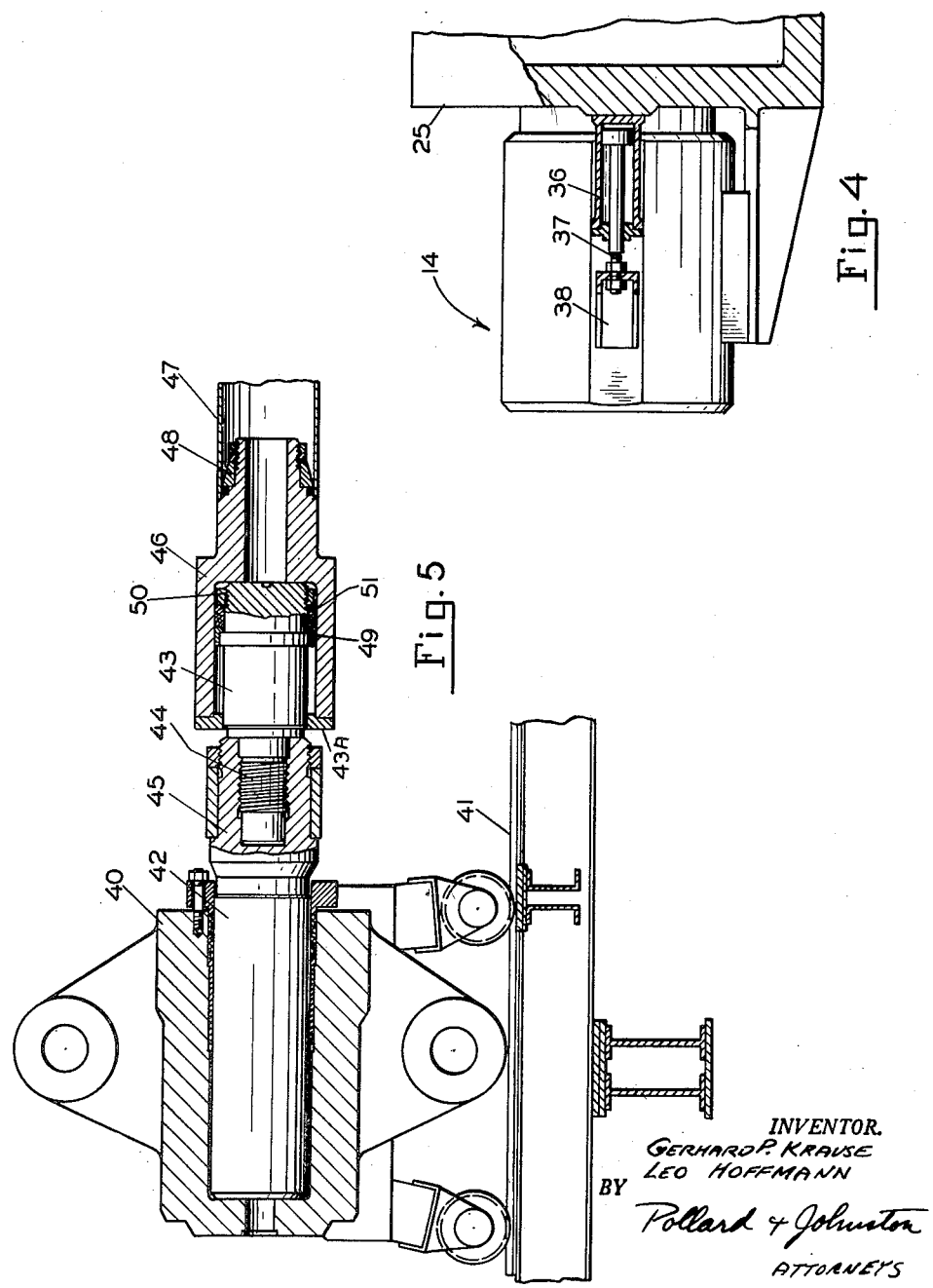
INVENTOR.
GERHARD P. KRAUSE
LEO HOFFMANN
BY
Pollard & Johnston
ATTORNEYS March 9, 1954

G. P. KRAŪSE ET AL 2,671,339

TUBE TESTING MACHINE

Filed April 26, 1950

INVENTOR.
GERHARD P. KRAUSE
LEO HOFFMANN
BY
Pollard & Johnston
ATTORNEYS

Patented Mar. 9, 1954

2,671,339

UNITED STATES PATENT OFFICE 2,671,339

TUBE TESTING MACHINE

Gerhard P. Krause, Flushing, and Leo Hoffmann, New York, N. Y., assignors to Hydropress, Inc., a corporation of Delaware Application April 26, 1950, Serial No. 158,098

11 Claims. (Cl. 73—37)

This invention relates to a machine wherein pressure is applied to the interior of a tube or the like, while the tube is being held adjacent its ends in sealed relationship with the machine, and is particularly concerned with mechanism compensating for changes in length and position of the tube relative to the sealing elements holding the ends thereof.

In previous testing devices, arrangements have been provided for placing pipes between sealing heads, the sealing heads being movable inwardly relative to each other so as to seal the ends of the pipe. Thereafter, fluid pressure has been applied to the interior of the tube for the purpose of testing the mechanical strength and fluid tightness of the tube, or for the purpose of expanding the tube so as to increase the size thereof. When a pipe or tube is to be expanded, a pair of outside die means can be employed so as to limit the expansion of the pipe and thus properly control the final size thereof.

One of the aforementioned sealing heads may be mounted on a hydraulic ram carried in a stationary housing at one end of the machine and the other sealing head can be mounted an a shiftable carriage at the other end of the machine, the shiftable carriage being movable along the machine frame so as to be at the proper distance from the stationary housing sealing head to receive the tube to be tested. It also is possible to use a hydraulic motor on the shiftable frame for moving its sealing head.

When end sealing heads are used wherein the ends of the pipe are held against a plate-like sealing means in abutting relationship, a longitudinally directed sealing force considerably larger than the hydraulic force created by the internal fluid pressure to be employed must be applied to the heads before application of fluid pressure to the pipe at the start of the test. This will subject the pipe to a severe buckling stress which will increase with the high test pressures required. In order to counteract this buckling stress, complicated means have been suggested for the purpose of building up or increasing the sealing pressure as the test pressure is increased.

Also, outside sealing heads can be used in place of end sealing heads in which case the pipe ends are slid into apertures or cavities in the sealing heads, thus reducing the end pressure required to prevent leakage, as compared with the end or longitudinal pressure necessary in end sealing devices. Also, inside sealing means have been employed where sealing head elements can be slid into the end portions of the pipe. The difficulties previously mentioned because of buckling is minimized by the use of such inside and outside sealing methods. Another problem is presented, however, because the pipes tend to shorten due to the internal pressure and compression of the ends by hydraulic pressure and thus move relative to the sealing heads if the sealing heads are fixed in location. Further, there is a tendency for the test head connected with the hydraulic ram to move backwards because of expansion of the hydraulic cylinder walls and because of compression of air which may be trapped in the system. Also, the machine structure and frame itself may be elongated by the high pressures. For example, in testing pipes of 40 feet of length and over, with common test pressure of 5,000 to 10,000 lbs. per square inch, relative movement between the test head and pipe due to the aforementioned causes may be as much as 1 inch and may be as high as 2½ inches. As a result, the packings employed in the sealing heads slide under high pressure over the rough outside surfaces of the pipe, the coupling on the end thereof, or the element being tested. Because of this, the effectiveness of the packings will be destroyed rapidly so that the machine will have to be shut down frequently for replacement and repairs thereof. Also, it becomes necessary to move the pipe through the packing an additional distance equal to that of the movement involved so as to prevent the pipe from moving outside of the packing during the testing. Furthermore, the portion of the pipe extending beyond the packing is not subjected to the test and, therefore, may be rejected as a result thereof.

One of the objects of this invention is to provide an improved means for compensating for pressure effects on the pipe and thus prevent movement of the pipe relative to the sealing heads.

In one aspect of the invention, this can be accomplished by providing a compensating element which is subjected to the testing fluid pressure, said element being mounted on a ram, the compensating element preferably integrally carrying the sealing head, which may be an outside or inside head. As pressure is exerted by the testing fluid inside the pipe, longitudinally acting forces, or forces along the axis of the tube, will be developed because of the pressure acting upon surfaces wherein a longitudinal vector force results, the effective areas of the pipes tending to move the pipe out of the sealing head and the effective areas of the compensating means counteracting such a tendency when pressure is applied. These areas can be so related that as pressure is built up in the pipe, the sealing head will remain stationary relative to the tube end. The areas developing longitudinally directed forces when subjected to pressure, said forces being directed along the axis of movement of the sealing heads, will be termed, "effective longitudinally acting pressure areas."

In a further aspect of the invention, arrangements can be provided to add to the compensating pressure automatically developed due to fluid pressure in the pipe being tested by the use of the aforementioned compensating device, by providing auxiliary compensating means connected to said compensating device. In this latter instance, it is possible, but not preferable, to make the previously mentioned effective longitudinally acting pressure areas approximately the same.

The compensating element in its preferred form is removably mounted on the machine.

The compensating mechanism also can be used advantageously with machines, such as pipe expanding devices, wherein there is a change in pipe length as the operation is performed.

These and other advantages, features and objects of the invention will become apparent from the following description and drawings which are merely exemplary:

In the drawings:

Figure 1 is a diagrammatic broken elevation of one form of machine to which the invention can be applied.

Figure 2 is an enlarged sectional view of the stationary housing sealing head of Figure 1.

Figure 3 is a fragmentary horizontal sectional view of the shiftable carriage sealing head of Figure 1 having the compensating ram element.

Figure 4 is an elevation of Figure 3.

Figure 5 is a fragmentary sectional view of another form of the invention.

Figure 7:
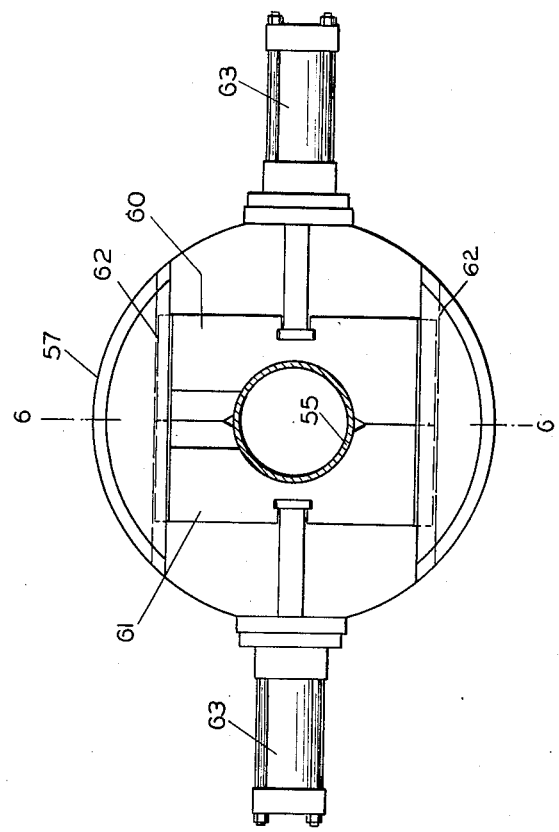
Figure 7 is an end view of Figure 6.

The invention will be described in conjunction with a pipe testing machine having a stationary housing with a hydraulic motor mounted thereon for moving its sealing head, there being a shiftable carriage or housing spaced therefrom carrying the other sealing head.

Frame 10 (Fig. 1) can have a stationary housing 11 with sealing head 12 thereon. Shiftable carriage or housing 13 can have a sealing head 14 located thereon, lock mechanism 15 being engageable with the various apertures 16 on the frame so as to lock the shiftable carriage in any desired position relative to the stationary housing. A hydraulic cylinder can be used in conjunction with the mounting of sealing head 14 on the shiftable carriage. Stationary housing 11 can have a suitable hydraulic motor 16A located thereon connected to sealing head 12 through support 12A. Valve mechanism (not shown) may be mounted on the stationary housing sealing head support 12A for furnishing fluid for testing purposes to a pipe carried in sealed relationship with the sealing head. Any number of clamping carriages 17 may be used as needed for holding the pipe or tube after it has been moved into alignment with the sealing heads.

Outside sealing head 12 may have a suitable aperture 13A (Fig. 2) for receiving the end 14A of the tube or pipe to be tested. A suitable sealing ring or packing 19 can be placed in an annular cut within the sealing head body aperture 13A for the purpose of producing a fluid tight joint between the outside of the pipe and the sealing head. Any suitable passage 20 may be used to connect the source of fluid pressure to the interior of the pipe to be tested.

The sealing head on shiftable carriage or housing 14 may comprise a test head 21 (Fig. 3) having a suitable packing ring 23, said packing or seal ring being engageable with the exterior surface of the pipe being tested. Test head 21 is slidably mounted on compensating ram or plunger member 24, the compensating ram member 24 being mounted on the shiftable carriage 25 by means of bolts or other fastening means permitting ready replacement or change so that different size elements can be used according to the pipe involved.

Test head 21 preferably has a removable bushing or sleeve 27, said sleeve having an annular positioning shoulder 28 mating with a suitable shoulder 29 in the test head. Nut or ring 31, screw-threadedly engaged at 32 with the test head, holds packing 30 therein and the sleeve or bushing 27 in place. The sleeve 27 and mating surface of the compensating ram can have their surfaces finely finished and chromium plated so as to reduce friction. The packings or seals may be of various kinds, including packings of the self-adjusting type.

Passage 33 through the compensating ram 24 is connected with passage 34 communicating with the control valve in the shiftable head 13. A transverse safety passage 35 is connected with the passage 33 which will release pressure when the parts have moved sufficiently far to encounter passage 35 and to vent the pressure in the pipe.

Auxiliary compensating or test head moving motors 36 can be mounted, if desired, on either side of the test head, said motors being carried by the shiftable carriage frame 25. The pistons therein are connected through piston rods 37 and brackets 38 with the test head. Motors 36 may be connected with any suitable source of pressure arranged to assist the compensating action of the mechanism. In some forms of the invention, the motors 36 can be omitted or springs can be employed in place thereof to return the test head to neutral position.

When the pipe is moved into a position between sealing heads 12 and 14, the sealing heads or mechanism can be operated or moved so that the pipe ends are moved into the apertures of each sealing head and then pressure can be exerted through passage 20 on the interior of the pipe. Preferably, the interior bore of the bushing 27 is made of greater diameter than the effective exterior diameter of the pipe, so that there is a difference between the effective diameter of the pipe and the effective diameter of the compensating ram, thus defining an effective longitudinally acting pressure area between the two effective diameters. When pressure is exerted on the interior of the pipe, the longitudinal force exerted by the pressure acting on the area difference between the pipe and ram will result in a longitudinal force causing relative movement between the test head 21 and compensating ram 24, so that the test head will move away from the ram. Thus, there will be no movement between the pipe and the test head. Also, the force and movement will cause pipe end 14A to remain in its relative location in the stationary housing sealing head 12.

As the pipe tends to bulge or enlarge, and therefore shorten, or the machine frame tends to lengthen, it is obvious that the effective difference in diameters between the pipe and ram in the compensating test head 14 will cause the pipe ends to maintain a fixed relationship with their respective sealing heads and thus, there will be no movement relative to the packing and no wear thereof.

Upon completion of the testing, test head motors 36, may be employed to return the test head into fully telescoped relationship with its compensating ram 24. It is apparent that arrangements can be made to apply pressure to the auxiliary test head motors 36 during testing for the purpose of augmenting the pressure exerted on the compensating ram. Also, suitable stops (not shown) can be provided to limit the outward movement of the test head relative to the ram.

Another form of the invention is illustrated in Figure 5, wherein the compensating arrangement also is applied to the shiftable housing seal head, although it could be at either end of the machine. In this form, an inside sealing arrangement is illustrated especially adapted for use in a pipe expanding machine. Shiftable housing 40 is supported on the frame of the machine 41 and has a fluid operated piston or ram 42 carried thereby. Compensating ram 43 is mounted by means of extension 44 to hydraulic ram extension 45, the compensating ram 43 having test head 46 slidably mounted thereon. The extension 44 can be detachably connected to ram 42 so as to facilitate change of parts according to the size of pipe involved. The compensating test head 46 is arranged for "inside sealing" wherein pipe 47 is slidable over the sealing elements 48 located on the test head. The sealing elements may be tapered in form so as to take the various shaped ends of pipe, particularly when bell mouthed pipe is used, and also when the sealing head is used in conjunction with pipe expanding machines for which this form is especially adaptable.

Sealing ring or bushing 49 is held on compensating ram 43 by suitable shoulders and the pressure of nut 50 against the packing 51. The effective outside diameter of the compensating ram is made greater than the effective inside diameter of the pipe so that a difference in area will exist therebetween. This will cause a longitudinal force to be exerted when pressure is applied so as to move the test head 46 outwardly relative to the ram. An auxiliary motor arrangement (not shown) can be used in conjunction with the compensating mechanism similar to that described for Figures 3 and 4. The stroke of the test head 46 relative to ram 43 is limited by the cover member 43A.

The arrangement shown in Figures 2 and 3 may also be used when testing a pipe with a coupling screwed on to it. In that case, the effective diameter of the compensating ram has to be made slightly larger than the outside diameter of the coupling. The pipe then will be pushed against the shoulder 64 (Fig. 6) on the stationary end and against the shoulder 65 (Fig. 3) on the adjustable end. The pipe is then subjected to a compression load equal to the product of the hydraulic pressure and the ring space between the outside diameter of the coupling or compensating ram and the inside diameter of the pipe.

Figure 6:
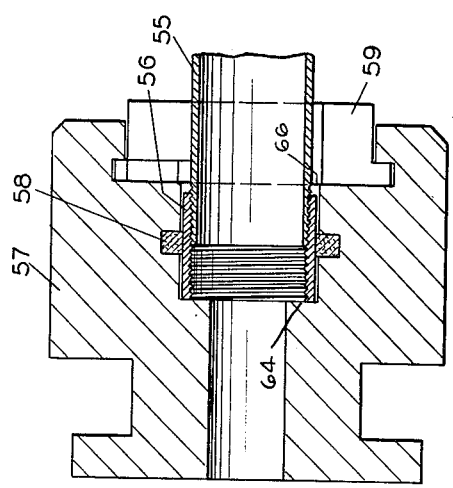
Figure 6 is a sectional view of a sealing head with clamping means for use where a pipe with a coupling is tested.

If it is desired to diminish this compression load to the value encountered when testing a pipe without a coupling, the clamp of Figures 6 and 7 may be employed. Sealing head 57 has an aperture in which pipe 55 with coupling 56 thereon is inserted. The other end of the pipe can be carried by a sealing head as illustrated in Figure 3. Coupling 56 is engaged by packing 58 located in the sealing head 57, the exterior of the coupling contact with the seal ring representing the effective diameter for sealing and longitudinal pressure exerting purposes. A coupling clamping mechanism is seen at 59 for holding the pipe in place in the sealing head. The clamping mechanism may comprise a pair of slidable lock plates 60 and 61, said lock plates being slidable in the guide grooves 62, 62. Movement of the lock plates 60 and 61 inwardly and outwardly relative to pipe 55 can be effectuated by means of hydraulic cylinders 63, 63.

The additional end load caused by the coupling area is then taken up by the shoulder 66 of the lock plates. The coupling is pushed against shoulder 66 by the force corresponding to the ring space between the coupling outside diameter and the pipe inside diameter. The compensating ram has the same diameter as is the case when plain pipe is tested, which is equal or slightly larger than the outside diameter of the pipe. Shoulder 65 exerts an end load corresponding to the ring space between the compensating ram and the pipe inside diameter. This is the only end force to which the pipe is subjected.

It is to be understood that variations may be made in the details of construction without departing from the spirit of the invention except as defined in the appended claims.

What is claimed is:

1. In a hydraulic tube testing machine, the combination comprising a pair of housings with sealing members carried thereby, said sealing members having means engaging longitudinally extending tube walls in sealing relationship, and a compensating means between one of said sealing members and the housing carrying the same, said compensating means having a plunger and cylinder connected with a sealing member, said plunger and cylinder being connected with the fluid inside a tube being tested, said plunger and cylinder having an effective longitudinally acting pressure area acting to move said compensating means outwardly relative to its housing, so that there is no movement between said sealing members and the walls of a tube held thereby.

2. In a hydraulic tube testing machine, the combination comprising a pair of housings with sealing members carried thereby, said sealing members having apertures for receiving the ends of a tube in sealing relationship, and a compensating means between one of said sealing members and the housing carrying the same, said compensating means having a plunger and cylinder connected with a sealing member, said plunger and cylinder being connected with the fluid inside a tube being tested, said plunger and cylinder having an effective longitudinally acting pressure area acting to move said compensating means outwardly relative to its housing, so that there is no movement between said sealing members and the walls of a tube held thereby.

3. In a hydraulic tube testing machine, the combination comprising a pair of housings with sealing members carried thereby, said sealing members having means engaging walls extending axially of said tube in sealing relationship, and a compensating means carried by one of said housings, said compensating means having a plunger attached to said housing and a cylinder connected with a sealing member and mounted on said plunger, said cylinder being connected with the fluid inside a tube being tested, said compensating cylinder being movable relative to the housing carrying the same, so that there is no movement between said sealing members and the ends of a tube held thereby, said plunger and cylinder having an effective longitudinal pressure area at least equal to the effective longitudinal pressure area of said tube moving said compensating means outwardly relative to its housing.

4. In a hydraulic tube testing machine, the combination comprising a pair of housings with sealing members carried thereby, said sealing members having apertures for receiving the ends of a tube in sealing relationship therewith, and a compensating means carried by one of said housings, said compensating means having a plunger attached to said housing and a cylinder connected with one of said sealing members and mounted on said plunger, said cylinder being connected with the fluid inside a tube being tested, said compensating cylinder means being movable relative to its housing so that there is no movement between said sealing members and the ends of a tube held thereby, said plunger and cylinder having an effective longitudinal pressure area at least equal to the effective longitudinal pressure area of said tube.

5. In a hydraulic machine, the combination comprising a pair of housings with sealing members carried thereby, said sealing members having means holding a tube in sealing relationship therewith, a hydraulic motor connected to one of said sealing means, and a compensating means between said sealing member and said hydraulic motor, said compensating means having a plunger and cylinder connected with one of said sealing members, said plunger and cylinder being connected with the fluid inside a tube being tested and held by said sealing member, said compensating means being movable relative to its hydraulic motor, so that there will be no movement between said sealing members and a tube held thereby, said hydraulic motor being operable to advance said sealing head relative to a tube to be engaged thereby.

6. In a hydraulic machine, the combination comprising a hydraulic motor having a cylinder and ram, a tube sealing member for receiving an end portion of a tube in sealing relationship therewith, a compensating means mounted on said hydraulic motor, said compensating means including a cylinder and a ram, a connection between said compensating cylinder and the fluid inside a tube being tested, said compensating means being movable relative to the hydraulic motor, so that there will be no movement between said sealing member and the tube held thereby, said plunger and cylinder having an effective longitudinal pressure area at least equal to the effective longitudinal pressure area of said tube.

7. In a hydraulic tube testing machine, the combination comprising a housing with a tube sealing member carried thereby, a compensating means between said sealing member and the housing carrying the same, said compensating means having a plunger and cylinder connected with the fluid inside a tube being tested, said compensating means being movable relative to its housing, and an auxiliary hydraulic motor connected to said compensating means, so that there is no movement between said sealing members and a tube held thereby.

8. In a hydraulic machine, the combination comprising a pair of housings with sealing members carried thereby, said sealing members being adapted to receive end portions of a tube in sealing relationship therebetween, a compensating means between one of said housings and the sealing member carried thereby, said compensating means having a plunger and a cylinder mounted on said plunger, said cylinder being connected with the fluid inside a tube being tested, said compensating cylinder being movable relative to its plunger, so that there will be no movement between said sealing members and a tube held thereby, said plunger and cylinder having an effective longitudinal pressure area at least equal to the effective longitudinal pressure area of said tube, and an auxiliary hydraulic motor connected to said compensating means, so that there is no movement between said sealing members and a tube held thereby.

9. In a hydraulic pipe testing machine, the combination comprising a hydraulic motor, a compensating ram mounted thereon, a pipe sealing member having a compensating cylinder, said cylinder being slidably mounted on said ram, and means connecting the interior of said pipe with the space between said ram and compensating cylinder, the effective longitudinal pressure areas of said pipe and compensating ram being chosen to cause an axially directed force to be exerted when the interior of the pipe is subjected to pressure.

10. In a hydraulic pipe testing machine, the combination comprising a hydraulic motor having a main ram, a compensating ram detachably mounted on said main ram, a sealing member having a compensating cylinder connected therewith, said sealing member being slidably carried on said compensating ram, and means connecting the interior of said pipe with the space between said ram and compensating cylinder, the effective longitudinal pressure areas of said pipe and compensating ram being chosen to cause an axially directed force to be exerted when the interior of the pipe is subjected to pressure.

11. In a hydraulic pipe testing machine, the combination comprising a hydraulic motor, a compensating ram mounted thereon, a compensating cylinder having an interior bore with a removable liner slidably carried on said ram, a pipe sealing member connected with said compensating cylinder and having an aperture therein integrally carried by said compensating cylinder, and means connecting the interior of said pipe with the space between said ram and compensating cylinder.

GERHARD P. KRAUSE.
LEO HOFFMANN.

References Cited in the file of this patent

UNITED STATES PATENTS

| Number | Name | Date |
|---|---|---|
| 1,876,711 | Mahla | Sept. 13, 1932 |
| 1,913,008 | Sundermann | June 6, 1933 |
| 1,973,674 | Rosenkranz | Sept. 11, 1934 |
| 2,445,876 | Fullerton | July 27, 1948 |
| 2,522,927 | Camerota | Sept. 19, 1950 |
| 2,551,645 | Stadelman | May 8, 1951 |
| 2,578,728 | Musser | Dec. 18, 1951 |